US008682716B2

(12) United States Patent
Redford et al.

(10) Patent No.: US 8,682,716 B2
(45) Date of Patent: *Mar. 25, 2014

(54) METHOD AND SYSTEM FOR MANAGING LIMITED USE COUPON AND COUPON PRIORITIZATION

(75) Inventors: Liane Redford, San Mateo, CA (US); Bryan Shimko, Scottsdale, AZ (US); James Mazour, St. Louis Park, MN (US); Rajkumar Viswanathan, Minnetonka, MN (US)

(73) Assignee: Visa U.S.A. Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/540,945

(22) Filed: Jul. 3, 2012

(65) Prior Publication Data

US 2013/0006744 A1 Jan. 3, 2013

Related U.S. Application Data

(60) Continuation of application No. 12/137,272, filed on Jun. 11, 2008, now Pat. No. 8,239,261, which is a division of application No. 10/660,211, filed on Sep. 10, 2003, now Pat. No. 8,015,060.

(60) Provisional application No. 60/410,554, filed on Sep. 13, 2002.

(51) Int. Cl.
*G06Q 30/00* (2012.01)

(52) U.S. Cl.
USPC ............... 705/14.22; 705/14.25; 705/14.26; 705/14.27; 705/14.28; 705/14.3; 705/14.33; 705/14.36; 705/14.38

(58) Field of Classification Search
USPC .......... 705/14.22, 14.25, 14.26, 14.27, 14.28, 705/14.3, 14.33, 14.36, 14.38
See application file for complete search history.

(56) References Cited

U.S. PATENT DOCUMENTS

| | | | |
|---|---|---|---|
| 3,935,933 A | 2/1976 | Tanaka et al. |
| 4,011,433 A | 3/1977 | Tateisi et al. |
| 4,108,350 A | 8/1978 | Forbes, Jr. |
| 4,124,109 A | 11/1978 | Bissell et al. |
| 4,195,864 A | 4/1980 | Morton et al. |
| 4,412,631 A | 11/1983 | Haker |
| 4,544,590 A | 10/1985 | Egan |
| 4,568,403 A | 2/1986 | Egan |
| 4,674,041 A | 6/1987 | Lemon et al. |
| 4,723,212 A | 2/1988 | Mindrum et al. |
| 4,742,215 A | 5/1988 | Daughters et al. |

(Continued)

FOREIGN PATENT DOCUMENTS

| | | |
|---|---|---|
| AU | 200039412 | 12/2000 |
| BE | 1002756 | 5/1991 |

(Continued)

*Primary Examiner* — Raquel Alvarez
(74) *Attorney, Agent, or Firm* — Kilpatrick Townsend Stockton LLP

(57) ABSTRACT

A system for managing coupon redemption and prioritization is provided. According to one aspect of the system, the system allows an electronic coupon or reward to be redeemed a specific number of times. The specific number of times may range from one to infinity. According to another aspect of the system, the system automatically resolves any redemption conflict associated with the concurrent redemption of electronic coupon(s) and paper-based coupon(s) by using certain predefined rules and logic.

18 Claims, 4 Drawing Sheets

(56) References Cited

U.S. PATENT DOCUMENTS

| | | |
|---|---|---|
| 4,794,530 A | 12/1988 | Yukiura et al. |
| 4,825,053 A | 4/1989 | Caille |
| 4,837,422 A | 6/1989 | Dethloff et al. |
| 4,841,712 A | 6/1989 | Roou |
| 4,868,376 A | 9/1989 | Lessin et al. |
| 4,882,675 A | 11/1989 | Nichtberger et al. |
| 4,910,672 A | 3/1990 | Off et al. |
| 4,930,129 A | 5/1990 | Takahira |
| 4,941,090 A | 7/1990 | McCarthy |
| 4,949,256 A | 8/1990 | Humble |
| 4,954,003 A | 9/1990 | Shea |
| 4,985,615 A | 1/1991 | Iijima |
| 4,992,940 A | 2/1991 | Dworkin |
| 5,019,452 A | 5/1991 | Watanabe et al. |
| 5,019,695 A | 5/1991 | Itako |
| 5,025,372 A | 6/1991 | Burton et al. |
| 5,056,019 A | 10/1991 | Schultz et al. |
| 5,060,793 A | 10/1991 | Hyun et al. |
| 5,060,804 A | 10/1991 | Beales et al. |
| 5,063,596 A | 11/1991 | Dyke |
| 5,115,888 A | 5/1992 | Schneider |
| 5,117,355 A | 5/1992 | McCarthy |
| 5,128,752 A | 7/1992 | Von Kohorn |
| 5,161,256 A | 11/1992 | Iijima |
| 5,173,851 A | 12/1992 | Off et al. |
| 5,185,695 A | 2/1993 | Pruchnicki |
| 5,200,889 A | 4/1993 | Mori |
| 5,202,826 A | 4/1993 | McCarthy |
| 5,227,874 A | 7/1993 | Von Kohorn |
| 5,256,863 A | 10/1993 | Ferguson et al. |
| 5,285,278 A | 2/1994 | Holman |
| 5,287,181 A | 2/1994 | Holman |
| 5,287,268 A | 2/1994 | McCarthy |
| 5,299,834 A | 4/1994 | Kraige |
| 5,308,120 A | 5/1994 | Thompson |
| 5,353,218 A | 10/1994 | De Lapa et al. |
| 5,380,991 A | 1/1995 | Valencia et al. |
| RE34,915 E | 4/1995 | Nichtberger et al. |
| 5,402,549 A | 4/1995 | Forrest |
| 5,417,458 A | 5/1995 | Best et al. |
| 5,420,606 A | 5/1995 | Begum et al. |
| 5,450,938 A | 9/1995 | Rademacher |
| 5,466,010 A | 11/1995 | Spooner |
| 5,471,669 A | 11/1995 | Lidman |
| 5,473,690 A | 12/1995 | Grimonprez et al. |
| 5,483,444 A | 1/1996 | Heintzeman et al. |
| 5,484,998 A | 1/1996 | Bejnar et al. |
| 5,491,326 A | 2/1996 | Marceau et al. |
| 5,491,838 A | 2/1996 | Takahisa et al. |
| 5,500,681 A | 3/1996 | Jones |
| 5,501,491 A | 3/1996 | Thompson |
| 5,513,102 A | 4/1996 | Auriemma |
| 5,515,270 A | 5/1996 | Weinblatt |
| 5,530,232 A | 6/1996 | Taylor |
| 5,531,482 A | 7/1996 | Blank |
| 5,535,118 A | 7/1996 | Chumbley |
| 5,537,314 A | 7/1996 | Kanter |
| 5,559,313 A | 9/1996 | Claus et al. |
| 5,564,073 A | 10/1996 | Takahisa |
| 5,577,266 A | 11/1996 | Takahisa et al. |
| 5,577,915 A | 11/1996 | Feldman |
| 5,578,808 A | 11/1996 | Taylor |
| 5,579,537 A | 11/1996 | Takahisa |
| 5,594,493 A | 1/1997 | Nemirofsky |
| 5,612,868 A | 3/1997 | Off et al. |
| 5,621,812 A | 4/1997 | Deaton et al. |
| 5,642,485 A | 6/1997 | Deaton et al. |
| 5,644,723 A | 7/1997 | Deaton et al. |
| 5,649,114 A | 7/1997 | Deaton et al. |
| 5,649,118 A | 7/1997 | Carlisle et al. |
| 5,650,209 A | 7/1997 | Ramsburg et al. |
| 5,687,322 A | 11/1997 | Deaton et al. |
| 5,689,100 A | 11/1997 | Carrithers et al. |
| 5,727,153 A | 3/1998 | Powell |
| 5,734,838 A | 3/1998 | Robinson et al. |
| 5,742,845 A | 4/1998 | Wagner |
| 5,754,762 A | 5/1998 | Kuo et al. |
| 5,761,648 A | 6/1998 | Golden et al. |
| 5,765,141 A | 6/1998 | Spector |
| 5,767,896 A | 6/1998 | Nemirofsky |
| 5,774,870 A | 6/1998 | Storey |
| 5,776,287 A | 7/1998 | Best et al. |
| 5,791,991 A | 8/1998 | Small |
| 5,794,210 A | 8/1998 | Goldhaber et al. |
| 5,797,126 A | 8/1998 | Helbling et al. |
| 5,802,519 A | 9/1998 | De Jong |
| 5,804,806 A | 9/1998 | Haddad et al. |
| 5,806,044 A | 9/1998 | Powell |
| 5,806,045 A | 9/1998 | Biorge et al. |
| 5,815,658 A | 9/1998 | Kuriyama |
| 5,822,735 A | 10/1998 | De Lapa et al. |
| 5,822,737 A | 10/1998 | Ogram |
| 5,832,457 A | 11/1998 | O'Brien et al. |
| 5,844,218 A | 12/1998 | Kawan et al. |
| 5,845,259 A | 12/1998 | West et al. |
| 5,855,007 A | 12/1998 | Jovicic et al. |
| 5,857,175 A | 1/1999 | Day et al. |
| 5,859,419 A | 1/1999 | Wynn |
| RE36,116 E | 2/1999 | McCarthy |
| 5,865,340 A | 2/1999 | Alvern |
| 5,865,470 A | 2/1999 | Thompson |
| 5,868,498 A | 2/1999 | Martin |
| 5,880,769 A | 3/1999 | Nemirofsky et al. |
| 5,884,271 A | 3/1999 | Pitroda |
| 5,884,277 A | 3/1999 | Khosla |
| 5,884,278 A | 3/1999 | Powell |
| 5,887,271 A | 3/1999 | Powell |
| 5,890,135 A | 3/1999 | Powell |
| 5,892,827 A | 4/1999 | Beach et al. |
| 5,898,838 A | 4/1999 | Wagner |
| 5,903,732 A | 5/1999 | Reed et al. |
| 5,903,874 A | 5/1999 | Leonard et al. |
| 5,905,246 A | 5/1999 | Fajkowski |
| 5,905,908 A | 5/1999 | Wagner |
| 5,907,350 A | 5/1999 | Nemirofsky |
| 5,907,830 A | 5/1999 | Engel et al. |
| 5,909,486 A | 6/1999 | Walker et al. |
| 5,912,453 A | 6/1999 | Gungl et al. |
| 5,915,244 A | 6/1999 | Jack et al. |
| 5,923,884 A | 7/1999 | Peyret et al. |
| 5,924,072 A | 7/1999 | Havens |
| 5,926,795 A | 7/1999 | Williams |
| 5,928,082 A | 7/1999 | Clapper, Jr. |
| 5,931,947 A | 8/1999 | Burns et al. |
| 5,943,651 A | 8/1999 | Oosawa |
| 5,950,173 A | 9/1999 | Perkowski |
| 5,953,047 A | 9/1999 | Nemirofsky |
| 5,953,705 A | 9/1999 | Oneda |
| 5,956,694 A | 9/1999 | Powell |
| 5,956,695 A | 9/1999 | Carrithers et al. |
| 5,958,174 A | 9/1999 | Ramsberg et al. |
| 5,960,082 A | 9/1999 | Haenel |
| 5,963,917 A | 10/1999 | Ogram |
| 5,969,318 A | 10/1999 | Mackenthun |
| 5,970,469 A | 10/1999 | Scroggie et al. |
| 5,974,399 A | 10/1999 | Giuliani et al. |
| 5,974,549 A | 10/1999 | Golan |
| 5,978,013 A | 11/1999 | Jones et al. |
| 5,987,795 A | 11/1999 | Wilson |
| 5,997,042 A | 12/1999 | Blank |
| 6,000,608 A | 12/1999 | Dorf |
| 6,002,771 A | 12/1999 | Nielsen |
| 6,003,113 A | 12/1999 | Hoshino |
| 6,003,134 A | 12/1999 | Kuo et al. |
| 6,005,942 A | 12/1999 | Chan et al. |
| 6,009,411 A | 12/1999 | Kepecs |
| 6,012,635 A | 1/2000 | Shimada et al. |
| 6,014,634 A | 1/2000 | Scroggie et al. |
| 6,024,286 A | 2/2000 | Bradley et al. |
| 6,038,551 A | 3/2000 | Barlow et al. |
| 6,041,309 A | 3/2000 | Laor |
| 6,047,325 A | 4/2000 | Jain et al. |
| 6,049,778 A | 4/2000 | Walker et al. |
| 6,052,468 A | 4/2000 | Hillhouse |

(56) References Cited

U.S. PATENT DOCUMENTS

| | | |
|---|---|---|
| 6,052,690 A | 4/2000 | de Jong |
| 6,052,785 A | 4/2000 | Lin et al. |
| 6,055,509 A | 4/2000 | Powell |
| 6,061,660 A | 5/2000 | Eggleston et al. |
| 6,067,526 A | 5/2000 | Powell |
| 6,070,147 A | 5/2000 | Harms et al. |
| 6,073,238 A | 6/2000 | Drupsteen |
| 6,076,068 A | 6/2000 | DeLapa et al. |
| 6,076,069 A | 6/2000 | Laor |
| 6,089,611 A | 7/2000 | Blank |
| 6,094,656 A | 7/2000 | De Jong |
| 6,101,422 A | 8/2000 | Furlong |
| 6,101,477 A | 8/2000 | Hohle et al. |
| 6,105,002 A | 8/2000 | Powell |
| 6,105,865 A | 8/2000 | Hardesty |
| 6,105,873 A | 8/2000 | Jeger |
| 6,112,987 A | 9/2000 | Lambert et al. |
| 6,112,988 A | 9/2000 | Powell |
| 6,119,933 A | 9/2000 | Wong et al. |
| 6,119,945 A | 9/2000 | Muller et al. |
| 6,122,631 A | 9/2000 | Berbec et al. |
| 6,129,274 A | 10/2000 | Suzuki |
| 6,144,948 A | 11/2000 | Walker et al. |
| 6,151,586 A | 11/2000 | Brown |
| 6,151,587 A | 11/2000 | Matthias |
| 6,154,751 A | 11/2000 | Ault et al. |
| 6,161,870 A | 12/2000 | Blank |
| 6,164,549 A | 12/2000 | Richards |
| 6,170,061 B1 | 1/2001 | Beser |
| 6,173,269 B1 | 1/2001 | Solokl et al. |
| 6,173,891 B1 | 1/2001 | Powell |
| 6,179,205 B1 | 1/2001 | Sloan |
| 6,179,710 B1 | 1/2001 | Sawyer et al. |
| 6,183,017 B1 | 2/2001 | Najor et al. |
| 6,185,541 B1 | 2/2001 | Scroggie et al. |
| 6,189,100 B1 | 2/2001 | Barr et al. |
| 6,189,787 B1 | 2/2001 | Dorf |
| 6,195,666 B1 | 2/2001 | Schneck et al. |
| 6,210,276 B1 | 4/2001 | Mullins |
| 6,216,014 B1 | 4/2001 | Proust et al. |
| 6,216,204 B1 | 4/2001 | Thiriet |
| 6,220,510 B1 | 4/2001 | Everett et al. |
| 6,222,914 B1 | 4/2001 | McMullin |
| 6,230,143 B1 | 5/2001 | Simons et al. |
| 6,237,145 B1 | 5/2001 | Narasimhan et al. |
| 6,241,287 B1 | 6/2001 | Best et al. |
| 6,243,687 B1 | 6/2001 | Powell |
| 6,243,688 B1 | 6/2001 | Kalina |
| 6,244,958 B1 | 6/2001 | Acres |
| 6,266,647 B1 | 7/2001 | Fernandez |
| 6,267,263 B1 | 7/2001 | Emoff et al. |
| 6,269,158 B1 | 7/2001 | Kim |
| 6,279,112 B1 | 8/2001 | O'Toole, Jr. et al. |
| 6,282,516 B1 | 8/2001 | Giuliani |
| 6,292,785 B1 | 9/2001 | McEvoy et al. |
| 6,292,786 B1 | 9/2001 | Deaton et al. |
| 6,296,191 B1 | 10/2001 | Hamann et al. |
| 6,299,530 B1 | 10/2001 | Hansted et al. |
| 6,321,208 B1 | 11/2001 | Barnett et al. |
| 6,327,573 B1* | 12/2001 | Walker et al. ............... 705/14.36 |
| 6,336,099 B1 | 1/2002 | Barnett et al. |
| 6,385,723 B1 | 5/2002 | Richards |
| 6,390,374 B1 | 5/2002 | Carper et al. |
| 6,480,935 B1 | 11/2002 | Carper et al. |
| 6,549,773 B1 | 4/2003 | Linden et al. |
| 6,549,912 B1 | 4/2003 | Chen |
| 6,594,640 B1* | 7/2003 | Postrel ........................ 705/14.27 |
| 6,612,490 B1 | 9/2003 | Herrendoerfer et al. |
| 6,681,995 B2 | 1/2004 | Sukeda et al. |
| 6,689,345 B2 | 2/2004 | Jager Lezer |
| 7,240,843 B2 | 7/2007 | Paul et al. |
| 8,407,251 B2* | 3/2013 | Bennett et al. ................ 707/784 |
| 2002/0002468 A1 | 1/2002 | Spagna et al. |
| 2002/0076051 A1 | 6/2002 | Nii |
| 2002/0143612 A1* | 10/2002 | Barik et al. ..................... 705/14 |
| 2003/0149619 A1* | 8/2003 | Stanley et al. .................. 705/14 |
| 2004/0073577 A1 | 4/2004 | Brady et al. ................ 707/104.1 |
| 2004/0210481 A1* | 10/2004 | Quinlan et al. ................. 705/14 |
| 2006/0100931 A1 | 5/2006 | Deaton et al. |
| 2007/0016533 A1* | 1/2007 | Fujimura ........................ 705/65 |
| 2009/0254971 A1* | 10/2009 | Herz et al. ........................ 726/1 |
| 2010/0179870 A1* | 7/2010 | Postrel ....................... 705/14.29 |
| 2012/0191530 A1* | 7/2012 | Williams et al. ........... 705/14.42 |
| 2013/0097664 A1* | 4/2013 | Herz et al. ........................ 726/1 |

FOREIGN PATENT DOCUMENTS

| | | |
|---|---|---|
| CA | 2293944 | 8/2000 |
| CA | 2267041 | 9/2000 |
| CA | 2317138 | 1/2002 |
| DE | 19522527 | 1/1997 |
| DE | 19848712 | 4/2000 |
| DE | 19960978 | 8/2000 |
| DE | 10015103 | 10/2000 |
| EP | 0203424 | 3/1986 |
| EP | 0292248 | 11/1988 |
| EP | 0475837 | 3/1992 |
| EP | 0540095 | 5/1993 |
| EP | 0658862 | 6/1995 |
| EP | 0675614 | 10/1995 |
| EP | 0682327 | 11/1995 |
| EP | 0875841 | 11/1998 |
| EP | 0936530 | 8/1999 |
| EP | 0938050 | 8/1999 |
| EP | 0938051 | 8/1999 |
| EP | 0944007 | 9/1999 |
| EP | 0949595 | 10/1999 |
| EP | 0982692 | 3/2000 |
| EP | 0984404 | 3/2000 |
| EP | 1085395 | 3/2001 |
| EP | 1102320 | 5/2001 |
| EP | 1111505 | 6/2001 |
| EP | 1113387 | 7/2001 |
| EP | 1113407 | 7/2001 |
| EP | 1168137 | 1/2002 |
| EP | 1233333 | 8/2002 |
| FR | 2772957 | 6/1999 |
| FR | 2793048 | 11/2000 |
| FR | 2794543 | 12/2000 |
| FR | 2796176 | 1/2001 |
| FR | 2804234 | 7/2001 |
| GB | 2331381 | 5/1999 |
| GB | 2343091 | 4/2000 |
| GB | 2351379 | 12/2000 |
| GB | 2355324 | 4/2001 |
| JP | 2000-112864 | 4/2000 |
| JP | 2000-181764 | 6/2000 |
| JP | 2001-202484 | 7/2001 |
| JP | 2001-236232 | 8/2001 |
| KR | 0039297 | 5/2001 |
| KR | 0044823 | 6/2001 |
| KR | 0058742 | 7/2001 |
| KR | 0021237 | 3/2002 |
| WO | WO 90/16126 | 12/1990 |
| WO | WO 95/21428 | 8/1995 |
| WO | WO 96/25724 | 8/1996 |
| WO | WO 96/38945 | 12/1996 |
| WO | WO 96/42109 | 12/1996 |
| WO | WO 97/05582 | 2/1997 |
| WO | WO 97/10562 | 3/1997 |
| WO | WO 97/39424 | 10/1997 |
| WO | WO 98/02834 | 1/1998 |
| WO | WO 98/09257 | 3/1998 |
| WO | WO 98/20465 | 5/1998 |
| WO | WO 98/43169 | 10/1998 |
| WO | WO 98/43212 | 10/1998 |
| WO | WO 98/52153 | 11/1998 |
| WO | WO 99/10824 | 3/1999 |
| WO | WO 99/16030 | 4/1999 |
| WO | WO 99/19846 | 4/1999 |
| WO | WO 99/44172 | 9/1999 |
| WO | WO 99/45507 | 9/1999 |
| WO | WO 99/49415 | 9/1999 |
| WO | WO 99/49426 | 9/1999 |

(56) References Cited

FOREIGN PATENT DOCUMENTS

| | | |
|---|---|---|
| WO | WO 00/39714 | 7/2000 |
| WO | WO 00/46665 | 8/2000 |
| WO | WO 00/54507 | 9/2000 |
| WO | WO 00/57315 | 9/2000 |
| WO | WO 00/57613 | 9/2000 |
| WO | WO 00/62265 | 10/2000 |
| WO | WO 00/62472 | 10/2000 |
| WO | WO 00/67185 | 11/2000 |
| WO | WO 00/68797 | 11/2000 |
| WO | WO 00/68902 | 11/2000 |
| WO | WO 00/68903 | 11/2000 |
| WO | WO 00/69183 | 11/2000 |
| WO | WO 00/75775 | 12/2000 |
| WO | WO 00/77750 | 12/2000 |
| WO | WO 01/04851 | 1/2001 |
| WO | WO 01/06341 | 1/2001 |
| WO | WO 01/08087 | 2/2001 |
| WO | WO 01/13572 | 2/2001 |
| WO | WO 01/15397 | 3/2001 |
| WO | WO 01/18633 | 3/2001 |
| WO | WO 01/18746 | 3/2001 |
| WO | WO 01/29672 | 4/2001 |
| WO | WO 01/33390 | 5/2001 |
| WO | WO 01/40908 | 6/2001 |
| WO | WO 01/42887 | 6/2001 |
| WO | WO 01/44900 | 6/2001 |
| WO | WO 01/44949 | 6/2001 |
| WO | WO 01/47176 | 6/2001 |
| WO | WO 01/50229 | 7/2001 |
| WO | WO 01/52575 | 7/2001 |
| WO | WO 01/55955 | 8/2001 |
| WO | WO 01/59563 | 8/2001 |
| WO | WO 01/61620 | 8/2001 |
| WO | WO 01/65545 | 9/2001 |
| WO | WO 01/67694 | 9/2001 |
| WO | WO 01/71648 | 9/2001 |
| WO | WO 01/71679 | 9/2001 |
| WO | WO 01/73530 | 10/2001 |
| WO | WO 01/73533 | 10/2001 |
| WO | WO 01/78020 | 10/2001 |
| WO | WO 01/80563 | 10/2001 |
| WO | WO 01/84377 | 11/2001 |
| WO | WO 01/84474 | 11/2001 |
| WO | WO 01/84512 | 11/2001 |
| WO | WO 01/88705 | 11/2001 |
| WO | WO 02/06948 | 1/2002 |
| WO | WO 02/10962 | 2/2002 |
| WO | WO 02/14991 | 2/2002 |
| WO | WO 02/15037 | 2/2002 |
| WO | WO 02/21315 | 3/2002 |
| WO | WO 02/29577 | 4/2002 |
| WO | WO 02/088895 | 11/2002 |

* cited by examiner

|  |  | Paper Coupon(s) presented | | |
|---|---|---|---|---|
|  |  | Store only | Manufacturer only | Both types |
| Electronic Coupon(s) ready to redeem | Store | Redeem paper, accumulate electronic (defer the reward) | Accumulate / Redeem both | Redeem paper, manufacturer coupon. Redeem paper store coupon. Accumulate store electronic coupon. |
|  | Manufacture | Accumulate / Redeem both | | |
|  |  | | Redeem paper, accumulate electronic (defer the reward) | Redeem paper, manufacturer coupon. Redeem paper store coupon. Accumulate store electronic coupon. |

*Fig. 3*

METHOD AND SYSTEM FOR MANAGING LIMITED USE COUPON AND COUPON PRIORITIZATION

CROSS-REFERENCES TO RELATED APPLICATION

This application is a continuation application of U.S. patent application Ser. No. 12/137,272, filed on Jun. 11, 2008, which is a divisional application of U.S. Patent Application No. 10/660,211, filed on Sep. 10, 2003, which claims the benefit of priority under 35 U.S.C. §119 from U.S. Provisional Patent Application Ser. No. 60/410,554, filed on Sep. 13, 2002, the contents of which are hereby incorporated by reference in their entirety for all purposes.

BACKGROUND OF THE INVENTION

The present invention generally relates to coupon redemption and, more specifically, to a method and system for managing coupon redemption and prioritization.

Conventional, existing paper-based coupon systems do not provide any automated means to monitor and/or limit the number of coupons that are redeemed by an individual or household. As a result, in situations where there are supposedly artificial limits on the number of coupons that can be redeemed by an individual or household, these limits cannot be effectively enforced. Due to the inability to monitor and limit the number of redeemable coupons, merchants or manufacturers sponsoring the coupons may suffer loss of revenues.

Additionally, paper coupons present an obvious opportunity for fraudulent copying that can be mitigated only by serially numbering each coupon and recording the use of each coupon via an on-line, real-time system. Such preventive measures would significantly increase the cost of paper-based coupon systems and, thus, are rarely employed.

Furthermore, existing smart card-based (and other card-based) loyalty systems also, in general, do not provide the means to limit coupon redemptions to a variable value determined by the coupon or reward program sponsor. Consequently, the coupon can only be redeemed once or an unlimited number of times. Each time a paper coupon or electronic reward is offered, the reward program sponsor need to determine the maximum cost associated with the redemption of such rewards in order to build a budget and business case for launching the reward program. Additionally, the strategy to be employed by the reward sponsor will dictate whether a single use, unlimited use or a specified number of uses would best achieve the objectives of the rewards program. The inability to limit coupon redemptions therefore makes it exceptionally difficult to establish a realistic maximum budget to fund the rewards attributed to redeemed coupons since use is dictated not only by cardholder activation but also by frequency of use.

Moreover, existing paper-based coupon and smart card-based loyalty systems do not provide any automated means to enforce rules associated with the combined redemption of coupons. Therefore, enforcement is generally performed manually (by reading the rules printed on each coupon) or enforcement is programmatically defined within the merchant's payment system application for each coupon that might be presented. Since the cost of continued updates to the merchant payment system would be prohibitive, redemption information is generally left to the clerk.

Similar issues exist for the prioritization of redemption of multiple coupons associated with a single transaction. Although this might be handled programmatically, the variety of coupon types and the sheer volume of coupons that might be presented at the merchant register would make software maintenance extremely cost prohibitive. As a result, coupons are generally applied in the order received.

Each reward (whether in the form of a paper coupon or an electronic program stored on a card or in a terminal) must be defined with a specific set of rules and legal restrictions in order to comply with legal requirements for disclosure to its potential recipients. Accordingly, those rules and legal restrictions must be enforced in order to insure that all recipients are receiving the same fair and impartial benefit. Therefore, rewards sponsors must define not only these rules but must also provide some level of assurance that the merchants that distribute the rewards can facilitate enforcement. Correspondingly, the rewards sponsor also establishes the rules in order to insure that the benefit derived by the recipient is consistent with the sponsor's business and financial plan and to insure that the reward creates an appropriate incentive for the consumer to perform the desired purchase behavior. Once electronic rewards are introduced, the challenges associated with rules enforcement become significantly more complex.

Hence, it would be desirable to provide a method and system that is capable of efficiently managing coupon redemption and prioritization.

BRIEF SUMMARY OF THE INVENTION

A system for managing coupon redemption and prioritization is provided. According to one exemplary aspect of the system, the system allows an electronic coupon or reward to be redeemed a specific number of times. The specific number of times may range from one to infinity.

According to another exemplary aspect of the system, the system automatically resolves any redemption conflict associated with the concurrent redemption of electronic coupon(s) and paper-based coupon(s) by using certain predefined rules and logic.

The present invention as described herein provides a number of benefits and advantages. For example, merchants would benefit from the use of the present invention since rules enforcement can be automated and applied at the token level. This reduces transaction time and the burden on clerks. Furthermore, the risk of coupon rejection by the program sponsor due to illegal and/or repeated use of a specific reward can be mitigated.

Reference to the remaining portions of the specification, including the drawings and claims, will realize other features and advantages of the present invention. Further features and advantages of the present invention, as well as the structure and operation of various embodiments of the present invention, are described in detail below with respect to accompanying drawings, like reference numbers indicate identical or functionally similar elements.

BRIEF DESCRIPTION OF THE DRAWINGS

FIG. 3 is a table showing an illustrative situation under which conflicts are resolved between paper-based and electronic coupons in accordance with an exemplary aspect of the present invention.

DETAILED DESCRIPTION OF THE INVENTION

Figure 1:
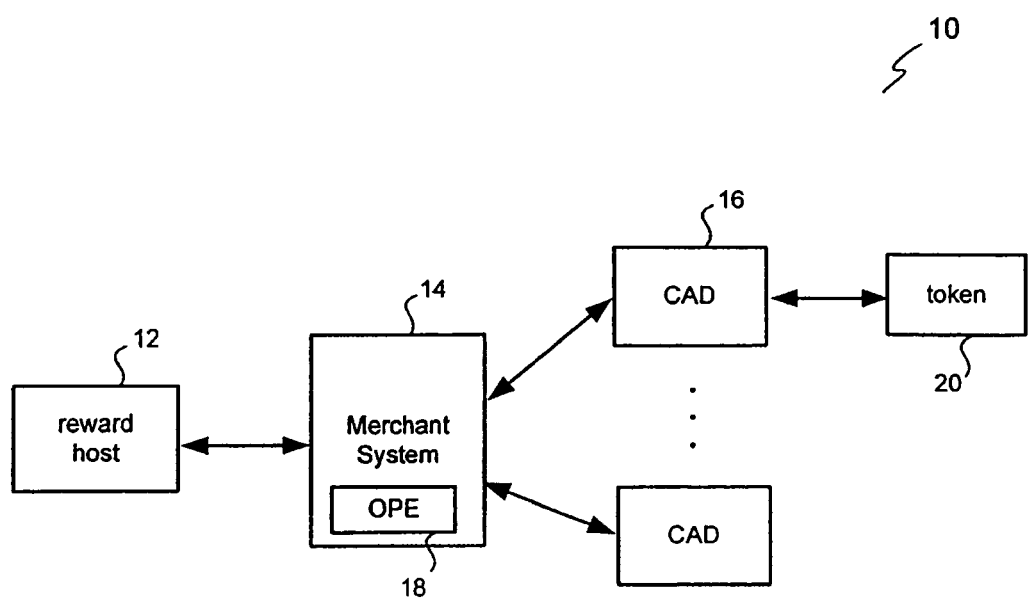
FIG. 1 is a simplified block diagram illustrating one exemplary embodiment of the present invention.

The present invention in the form of one or more exemplary embodiments will now be described. FIG. 1 is a simplified block diagram illustrating one exemplary embodiment of the present invention. According to this exemplary embodiment, the system 10 includes a reward host 12, a merchant system 14, a number of card acceptance devices (CADs) 16 and a number of tokens 20. The reward host 12 is responsible for handling transactions generated by reward program participants. The reward host 12 is configured to communicate with the CADs 16 via the merchant system 14 thereby allowing reward transactions to be processed. The merchant system 14 further includes an open program engine (OPE) 18. The OPE 18 includes control logic that is used to control processing of a transaction under the reward program and facilitate communication between the reward host 12 and the CADs 16. In one exemplary implementation, the OPE 18 is a card acceptance point device software module that interacts with the merchant system 14 to facilitate communications between the reward host 12 and the CADs 16. Alternatively, the functionality of the OPE 18 can be integrated into the merchant system 14. It should be further understood that, in alternative embodiments, the system 10 may include multiple merchant systems, each merchant system having its corresponding OPE and associated CADs. In other words, the reward host 12 is capable of handling coupon redemption and prioritization on multiple merchant systems. In an alternative exemplary embodiment, the OPE 18 can be implemented on a device coupled to the Internet.

In one exemplary implementation, the reward host 12 is a computer server having a number of software applications. These software applications manage a list of reward program participants which are each uniquely identified and maintain information relating to different reward programs. As will be further described below, the reward host 12 uses information relating to different reward programs to upload corresponding reward program parameters and other messages to each CAD 16.

Each CAD 16 is equipped to receive and communicate with the token 20 provided by a reward program participant. The token 20 contains, amongst other things, information that is specific to the reward program participant, such as, reward programs that the participant is eligible to participate in and rewards accumulated in the corresponding reward programs. In one exemplary implementation, the token 20 is a smartcard. It should be understood that the token 20 includes other types of portable devices including, for example, a cellular phone, a personal digital assistant (PDA), a pager, a payment card (such as, a credit card and an ATM card), a security card, an access card, smart media, a transponder, and the like.

Each CAD 16 is enabled with application software that provides device-specific functionality as well as the capability to interact with the reward host 12, to receive downloads of new reward programs and other security updates and to forward batched loyalty transactions back to the reward host 12 when appropriate. The application software also enables the CAD 16 to securely interact with the token 20 in a transaction to determine if the reward program participant has qualified for a specific reward and to facilitate both the earn process (addition of a reward benefit to the token) and the redemption process (utilizing either a stored reward on the token or an electronic coupon). Preferably, the application software stores a limited quantity of transaction batches for delivery to the reward host 12. Furthermore, the application software also stores parameters for new loyalty or reward programs for current day or future day activation.

CADs 16 can be incorporated into or integrated with a number of different devices including, for example, smart card enabled point of sale terminals, kiosks, vending machines and electronic cash registers. In other exemplary embodiments, the CAD 16 can be any token acceptance devices that are capable of communicating with the token 20 including a point-of-sale device, a cellular phone, a personal digital assistant (PDA), a personal computer (PC), a tablet PC, a handheld specialized reader, a set-top box, an electronic cash register, a virtual cash register, a kiosk, a security system, an access system, and the like.

According to one exemplary aspect of the system 10, the system 10 is able to monitor, manage and limit the number of times a reward or coupon can be redeemed on the token 20. The system 10 is also able to stop coupon accumulation once a redemption limit has been reached on the token 20. Furthermore, the system 10 allows a program administrator to set a limit to the number of times an immediate or delayed coupon or series of punches can be redeemed for a loyalty or reward program.

In an exemplary embodiment, the system 10 includes a set of software components that allow a reward sponsor to determine or set the specific number of times (e.g., from one (1) to unlimited) when the reward can be redeemed by a specific token 20 during a specified time period of validity. This set of software components is distributed amongst the reward host 12, the CAD 16 and the token 20.

One software component is an application that resides in or provides support to the CAD 16. This CAD application includes, among other reward specific elements, a variable field that can be set at the reward host 12 when the loyalty or reward program is originally defined and established. The variable field is a redemption limit parameter. The value of the redemption limit parameter represents the maximum number of times that the reward, once earned, can be redeemed. Alternatively, the redemption limit parameter can be stored in the OPE 18. The CAD 16 is capable of handling multiple reward programs. As a result, there may be multiple redemption limit parameters corresponding to the multiple reward programs.

Another software component is within an applet stored on the token 20 (e.g., a smartcard or other portable device). This token component includes a dynamic data field that is updated each time the corresponding reward is redeemed. The dynamic data field is a redemption tally parameter. Similarly, since the token 20 may contain information relating to multiple reward programs that the reward program participant is eligible to participate in, the token 20 may also contain multiple corresponding redemption tally parameters.

When the reward program participant performs a qualifying transaction under a selected reward program during the reward validity period, the CAD application queries the token 20 to obtain the value stored in the corresponding redemption tally parameter within the token component. This value is then compared to the value of the appropriate redemption limit parameter stored within the CAD application. If the value of the redemption tally parameter is equal to that of the redemption limit parameter, the reward is not applied to the transaction. If the value of the redemption tally parameter is zero or any value less than the value of the redemption limit parameter, the reward is applied to the transaction.

Figure 2:
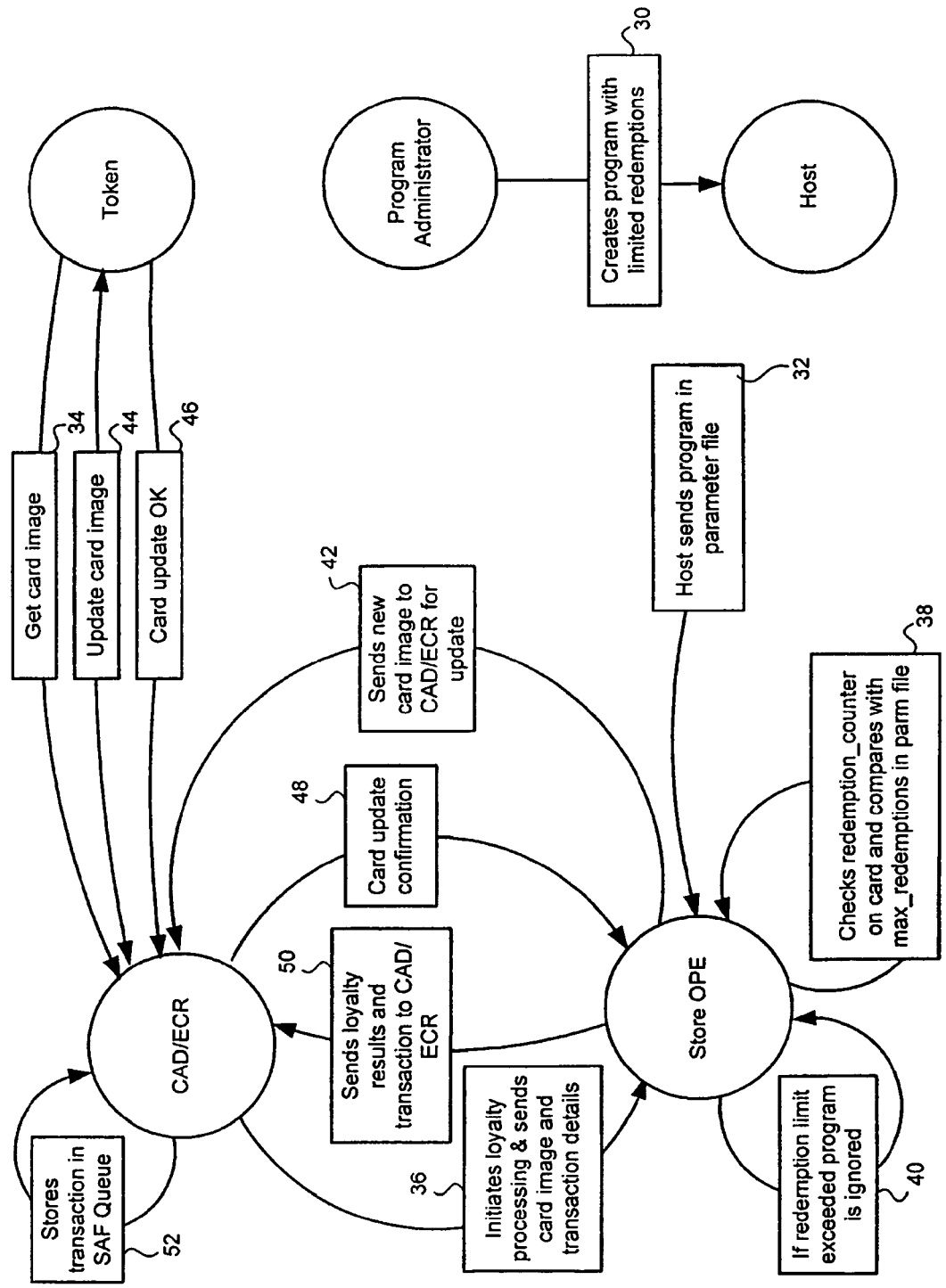
FIG. 2 is a flow diagram illustrating the reward redemption process flow in accordance with an exemplary aspect of the present invention.

FIG. 2 is a flow diagram illustrating the reward redemption process flow in accordance with an exemplary embodiment of the present invention. Referring to FIG. 2, at 30, a program administrator who is responsible for managing the loyalty or reward program creates respective redemption limits for one or more rewards that are available under that reward program. The redemption limits can be based on a number of conditions, for example, the types of rewards or the identity of the reward program participants or a combination of both. For instance, a certain type of reward may be designed to have a redemption limit that is different from other types of rewards, or reward program participants may be allowed to have varying corresponding redemption limits depending on qualifications of the reward program participants. Based on the disclosure and teachings provided herein, a person of ordinary skill in the art will appreciate how to design the appropriate redemption limits depending on the constraints and/or design of each reward program. In an exemplary implementation, the program administrator uses a user interface provided by the reward host 12 to create the desired redemption limits. The redemption limits are then stored in the reward host 12. Furthermore, reward host 12 also allows the reward program sponsor to subsequently modify the desired redemption limits due to, for example, new conditions and/or changes to the reward program imposed by the reward program sponsor.

At 32, the reward host 12 forwards information relating to the redemption limits to the appropriate OPEs 18. In an exemplary aspect, in order to optimize computing resources, the appropriate OPEs 18 are determined based on whether such OPEs 18 need to handle transactions for the particular reward program associated with the redemption limits. The information relating to the redemption limits is then subsequently used by the OPEs 18 to control the reward redemption process. Since the redemption limits can be modified, the reward host 12 periodically forwards any modified redemption limit (s) to the appropriate OPEs 18.

At 34, a reward program participant uses his/her token 20 to initiate a transaction with the CAD 16. A token image is retrieved by the CAD 16 from the token 20. The token image includes information about the reward program participant, such as, reward programs that the reward program participant is eligible for, rewards earned and rewards redeemed. Transaction details are also provided by the reward program participant to the CAD 16. For example, the reward program participant may indicate to the CAD 16 which reward program s/he wishes to apply to the transaction as well as the reward selected for redemption under that reward program. In certain situations, the reward program may allow multiple rewards to be selected and applied to the transaction; in other situations, the transaction may qualify for redemption under multiple reward programs.

At 36, the CAD 16, in turn, initiates processing of the transaction with the OPE 18. In an exemplary implementation, the token image and the transaction details are passed by the CAD 16 to the OPE 18 for processing.

At 38, the OPE 18 identifies the selected reward program and the corresponding selected reward that are to be applied to the transaction and extracts the appropriate redemption tally parameter from the token image and then compares it against the appropriate redemption limit parameter that has been previously provided by the reward host 12.

At 40, if the OPE 18 determines that the redemption tally parameter is greater than or equal to the redemption limit parameter, then the selected reward program and the corresponding selected reward are not applied to the transaction. On the other hand, if redemption tally parameter is less than the redemption limit parameter, the transaction is processed according to the rules of the selected reward program. As part of the processing, the redemption tally parameter is incremented appropriately and the token image is updated to incorporate the latest reward program information relating to the reward program participant.

At 42, the OPE 18 then forwards the updated token image to the CAD 16. At 44, the CAD 16, in turn, updates the token 20 with the updated token image. At 46, once the token 20 successfully receives the updated token image, the token 20 forwards an acknowledgment to the CAD 16. At 48, upon receiving the acknowledgment, the CAD 16 forwards a confirmation of the token update to the OPE 18. At 50, upon receiving the confirmation, the OPE 18 forwards the processed reward and transaction results to the CAD 16. At 52, the CAD 16 stores the processed reward and transaction results in a report queue or batch. Contents of the report queue or batch are periodically uploaded to the reward host 12 for reporting and tabulation.

It should be noted that the respective functionality performed by the CAD 16 and the OPE 18 can be combined or distributed between the CAD 16 and the OPE 18 depending on the various factors, such as, design and/or system constraints. For example, the redemption limit parameter can be stored in the CAD 16 as mentioned above, and the control logic for checking the redemption limit parameter against the redemption tally redemption can be implemented on the CAD 16 as well. Based on the disclosure and teachings provided herein, a person of ordinary skill in the art will know of other ways and/or methods to distribute the collective functionality of the CAD 16 and the OPE 18 in various different configurations in an integrated or modular manner. While the foregoing description illustrates a reward redemption process, it should be understood that the system as described herein may also be used to monitor and control other aspects or processes relating to a reward.

According to another exemplary aspect of the system 10, the system 10 is able to prioritize multiple coupon redemptions. The system 10 is able to resolve redemption conflicts between two or more rewards or coupons. The rules and logic used to resolve redemption conflicts are maintained by the system 10. For example, the system 10 is able to resolve redemption conflicts between a paper-based coupon and an electronic coupon, both of which are redeemable for the same reward. In one illustrative situation, if an electronic coupon on the token 20 and a paper-based coupon of the same type (e.g. both are manufacturer or both are store coupons) are presented for redemption for the same SKU item during a single transaction, the paper-based coupon is redeemed first. Alternatively, the redemption order may be reversed depending on other constraints, such as, the rules specified by the reward program sponsor.

If a paper-based coupon from a manufacturer has been applied to a specific item, then the manufacturer's electronic coupon on the token 20 is not applied to the same item in the same transaction. Furthermore, loyalty or reward is delayed till the next transaction when manufacturers paper-based coupons and electronic coupons with identical product codes (e.g., SKU, bar code DPCI) are presented. FIG. 3 is a table showing the foregoing illustrative situation under which conflicts are resolved between paper-based and electronic coupons in accordance with one exemplary set of business rules of the present invention.

In an exemplary embodiment, the system 10 includes a set of software components that allow a reward program sponsor to define the circumstances under which one or more electronic rewards or coupons stored on the token 20 (e.g. smartcard) can be applied and/or redeemed to a particular transaction when a paper-based coupon is also presented. It should also be noted that the system 10 includes devices that are capable of capturing information from a paper-based coupon. Such devices include, for example, a bar code scanner or other similar types of devices.

One software component is an application that resides in or provides support to the CAD 16. This CAD application 16 includes, among other reward specific elements, a data field that can be set at the reward host 12 when the loyalty or reward program is originally defined and established. This field represents the coupon type (e.g., manufacturer, store, etc.). Other priorities may be assigned to this coupon type field. The CAD application has control logic that automatically allows or disallows the use of an electronic coupon when a reward program participant concurrently presents a paper-based coupon to be applied to the same purchase transaction. The coupon type field is used to indicate the source of the reward or discount being offered, whether in-store or manufacturer. The OPE 18 uses this information to allow taxes to be calculated correctly and enforce the redemption priority between paper-based coupons and electronic coupons.

The coupon type field is optional. In one exemplary embodiment, the coupon type field is a one-byte flag and may have the following values:
"NULL" for "not specified";
"S" for "store";
"M" for "manufacturer"; and
"O" for "other".
If not used or required, the coupon type field can be set to space.

Additional control logic within the CAD application defines the logical order (priority) in which paper-based coupons and electronic coupons are to be applied to the same purchase transaction, if either a paper-based coupon and an electronic coupon can be applied.

The CAD application further maintains other types of information relevant to the corresponding loyalty or reward programs. For example, the CAD application may maintain two fields, a store paper coupon quantity field and a manufacturer coupon quantity field.

Data in the store paper coupon quantity field is sent from the CAD 16 to the OPE 18 and is used to indicate which and how many items have already been used in store paper coupon redemptions. In one implementation, this field is a 3-digit numeric field and may have a value in the range between "0-999". A value of "0" means a store paper coupon was not redeemed against this item.

Data in the manufacturer coupon quantity field is also sent from the CAD 16 to the OPE 18 and is used to indicate which and how many items have already been used in manufacturer paper coupon redemptions. In one implementation, this field is a 3-digit numeric field and may have a value in the range between "0-999". A value of "0" means a manufacturer paper coupon was not redeemed against this item.

Another software component is an application that is stored within the merchant payment system (e.g., electronic cash register, store controller, etc.). This application records the submission of paper-based coupons by type (e.g., manufacturer, store, etc.) as the reward program participant presents such coupons to the cashier for redemption. This application interacts with the CAD 16 and CAD application.

When the reward program participant performs a qualifying transaction during the validity period of the electronic coupon and the reward program participant concurrently presents one or more paper coupons, the merchant payment system application queries the CAD application to determine if any electronic rewards can be applied to the transaction. If the CAD application determines that an electronic reward can be applied, the merchant payment system application then reads the list of paper-based coupons that have been presented with the transaction and determines if any of the paper-based coupons conflicts with any of the electronic coupons. For example, a conflict may occur because at least one paper-based coupon and one electronic coupon apply to the same product number. In the event a conflict is detected, the CAD application utilizes embedded logic to determine whether or not the electronic coupon should be applied in addition to the paper-based coupon. If it is determined that both the paper-based coupon and the electronic coupon can be applied, the CAD application informs the merchant payment system application of the value of the electronic coupon to be applied. On the other hand, if it is determined that there is a conflict between the paper-based coupon and the electronic coupon, the CAD application informs the merchant payment system accordingly and, if appropriate, stores the electronic coupon within the memory of the token 20 for future use by the reward program participant.

Figure 4:
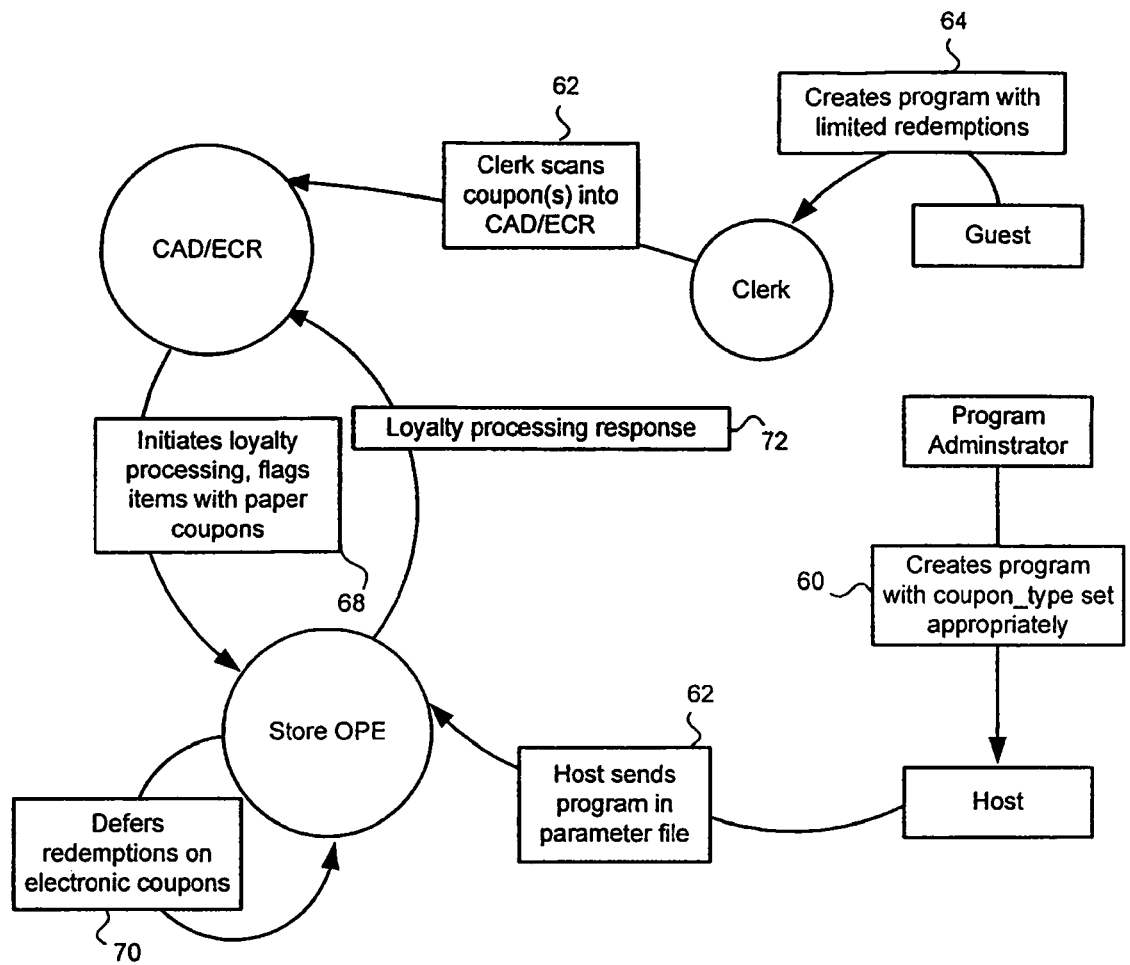
FIG. 4 is a flow diagram illustrating the redemption conflict resolution process flow in accordance with an exemplary aspect of the present invention.

FIG. 4 is a flow diagram illustrating the redemption conflict resolution process flow in accordance with an exemplary aspect of the present invention. Referring to FIG. 4, at 60, the program administrator who is responsible for managing the loyalty or reward program creates respective redemption resolution rules for one or more rewards that are available under that reward program. The redemption resolution rules can be based on a number of conditions. Based on the disclosure and teachings provided herein, a person of ordinary skill in the art will appreciate how to design the appropriate redemption resolution rules depending on the constraints and/or design of each reward program. In an exemplary implementation, the program administrator uses the user interface provided by the reward host 12 to create the desired redemption resolution rules. The redemption resolution rules are then stored in the reward host 12. Furthermore, the reward host 12 allows the reward program sponsor to subsequently modify the redemption resolution rules due to, for example, new conditions and/or changes to the reward program imposed by the reward program sponsor.

At 62, the reward host 12 forwards information relating to the redemption resolution rules to the appropriate OPEs 18. In an exemplary aspect, in order to optimize computing resources, the appropriate OPEs 18 are determined based on whether such OPEs 18 need to handle transactions for the particular reward program associated with the redemption resolution rules. The information relating to the redemption resolution rules is then subsequently used by the OPEs 18 to control the redemption resolution process. Since the redemption resolution rules can be modified, the reward host 12 periodically forwards any modified redemption resolution rule(s) to the appropriate OPEs 18.

At 64, a reward program participant initiates a transaction using his/her token 20 and at least one paper-based coupon. For example, the reward program participant presents his token 20 and the paper-based coupon to a clerk. In some situations, two or more paper-based coupons can be presented for redemption.

At 66, the clerk scans the presented paper-based coupon into the CAD 16 thereby allowing relevant information to be retrieved. The clerk also inserts the token 20 into the CAD 16 thereby allowing the token image to be retrieved by the CAD. The token image includes information about the reward program participant, such as, reward programs that the reward program participant is eligible for, electronic coupons representing rewards earned and available for redemption, and rewards redeemed. Transaction details may also be provided by the clerk to the CAD 16. For example, the clerk may indicate to the CAD 16 which reward program the reward program participant wishes to apply to the transaction as well as the electronic coupon selected for redemption under that reward program. In some situations, multiple electronic coupons may be selected for redemption.

At 68, the CAD 16 initiates processing of the transaction with the OPE 18. In an exemplary implementation, the token image, information retrieved from the presented paper-based coupon(s) and the transaction details are passed by the CAD 16 to the OPE 18 for processing.

At 70, the OPE 18 determines whether there is any conflict with the concurrent redemption of the selected electronic coupon and the presented paper-based coupon. If it is determined that there is a conflict, the OPE 18 uses the redemption resolution rules to resolve the conflict. For example, in one situation, if redemption of the electronic coupon and the paper-based coupon is mutually exclusive (as in a case where both the electronic coupon and the paper-based coupon are essentially the same reward offered by the same sponsor) and the paper-based coupon takes priority over the electronic coupon, then the redemption of the electronic coupon is deferred; in another situation, concurrent redemption of the electronic coupon and the paper-based coupon may be allowed (as in a case where the electronic coupon is a manufacturer reward and the paper-based coupon is a store reward). Based on the disclosure and teachings provided herein, a person of ordinary skill in the art will appreciate how to resolve redemption conflict in various types of situations.

At 72, the processing results are forwarded by the OPE 18 to the CAD 16. The CAD 16 may then display the processing results appropriately to the clerk and/or the reward program participant. For example, the CAD 16 may inform the reward program participant that the previously selected electronic coupon has not been redeemed due to the redemption of the paper-based coupon, or vice versa. In addition, the CAD 16 may also update the token image of the token 20 based on the processing results. For example, if the previously selected electronic coupon is redeemed, the token image on the token 20 is updated to reflect such redemption.

While the foregoing description illustrates a coupon prioritization process between a paper-based coupon and an electronic coupon, it should be understood that the system as described herein may also be used to handle coupon prioritization between other types of coupons. For example, the system 10 may be used to resolve redemption conflict between two paper-based coupons respectively offered by a manufacturer and a store. The present invention can also be extended to apply to other types of prioritization process between two electronic documents. For example, the present invention can be applied to manage the prioritization between a smartcard coupon and an electronic gift certificate represented by a discount number. Based on the disclosure and teachings provided herein, a person of ordinary skill in the art will know how to apply the present invention to other types of situations.

The system 10 as described above includes a number of software components. It should be understood that in addition to the configurations described above, the software components may be distributed in other manners, integrated or modular or otherwise, amongst the various components of the system 10 to achieve the same collective functionality, depending on factors such as the design and resource constraints of the system 10.

The system 10 as described above can be used and applied in many different situations. For example, the system 10 can be used with any smartcard-based loyalty program which stores loyalty data in distinct areas (slots) within a card applet and utilizes an intelligent software application within the CAD 16 and/or acceptance point payment system to perform logical calculations for the application of rewards to purchase transactions.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference for all purposes in their entirety.

What is claimed is:

1. A system for resolving coupon redemption conflicts, comprising:
    a token acceptance device configured to receive information relating to a first coupon, the token acceptance device further configured to store a set of redemption resolution rules pertaining to redemption of a second electronic coupon and the first coupon, the token acceptance device having control logic configured to use the set of redemption resolution rules to determine whether there is a conflict when the second electronic-coupon and the first coupon are concurrently presented for redemption for a same transaction, and
    wherein both the first coupon and the second electronic coupon are redeemed together for the same transaction when no conflict exists, and wherein the system prioritizes either the first coupon or the second electronic coupon for redemption based on the redemption resolution rules when there is a conflict between the first coupon and the second electronic coupon.

2. The system of claim 1 further comprising:
    a token configured to store the second electronic coupon redeemable for a corresponding reward under a reward program.

3. The system of claim 1 further comprising:
    a reward host configured to allow a reward program sponsor to define the set of rules and communicate the set of rules to the token acceptance device.

4. The system of claim 3 wherein the reward host is further configured to allow the reward program sponsor to change the set of rules in response to one or more conditions.

5. The system of claim 1 further comprising:
    a token configured to store the second electronic coupon redeemable for a corresponding reward under a reward program, wherein the token includes one of a smartcard card, a cellular phone, a personal digital assistant, a pager, a payment card, a security card, an access card, smart media and a transponder.

6. The system of claim 1 wherein the token acceptance device includes one of a point-of-sale device, a cellular phone, a personal digital assistant (PDA), a personal computer (PC), a tablet (PC), a handheld specialized reader, a set-top box, an electronic cash register, a virtual cash register, a kiosk, a security system, and an access system.

7. The system of claim 1 wherein when it is determined that there is a conflict, redemption of either the second electronic coupon or the first is deferred.

8. The system of claim 1 wherein the first coupon is a paper based coupon.

9. The system of claim 1, wherein the system prioritizes between the first coupon and the second electronic coupon when there is a conflict based on the redemption resolution rules instead of based on any identifiers associated with the coupons.

10. The system of claim 1, wherein the system prioritizes between the first coupon and the second electronic coupon when there is a conflict based on the redemption resolution rules indicating circumstances under which one or more electronic coupons stored on a token can be redeemed concurrently with a coupon from a different source for the same transaction.

11. The system of claim 1, wherein the token acceptance device is further configured to enable a rewards program sponsor to define the circumstances under which one or more electronic coupons stored on a token can be redeemed concurrently with a coupon from a different source for the same transaction.

12. A method for managing coupon redemption under a reward program, comprising:
  receiving, at a token acceptance device, data relating to a first coupon from a portable token adapted to store one or more electronic coupons relating to one or more rewards programs;
  storing a set of redemption resolution rules pertaining to redemption of the first coupon and a second electronic coupon from a different source;
  determining, by the token acceptance device, if there is a conflict when the second electronic coupon and the first coupon are concurrently presented for redemption in a same transaction; and
  resolving, by the token acceptance device, the conflict, wherein both the first coupon and the second electronic coupon are redeemed together for the same transaction when no conflict exists, and wherein the system prioritizes for redemption either the first coupon or the second electronic coupon based on the redemption resolution rules when a conflict exists between the first coupon and the second electronic coupon.

13. The method of claim 12 further comprising:
  storing a redemption limit associated with the second electronic coupon in the token acceptance device.

14. The method of claim 13 wherein the redemption limit is established based on one or more criteria that are specific to a holder of the token.

15. The method of claim 12 wherein the first coupon is a paper coupon.

16. The method of claim 12 further comprising:
  storing a redemption limit associated with the second electronic coupon in the token acceptance device; and
  allowing the reward program sponsor to change the redemption limit based on one or more conditions.

17. The method of claim 12 wherein the token includes one of a smartcard card, a cellular phone, a personal digital assistant, a pager, a payment card, a security card, an access card, smart media and a transponder.

18. The method of claim 12 wherein the token is a phone.

* * * * *